(12) United States Patent
Zheng et al.

(10) Patent No.: US 12,606,309 B2
(45) Date of Patent: Apr. 21, 2026

(54) VEHICLE COOLING SYSTEM

(71) Applicant: Honeywell International Inc., Charlotte, NC (US)

(72) Inventors: Zhanjun Zheng, Shanghai (CN); Yunfei Zou, Shanghai (CN); Fangmin Deng, Changsha (CN); Jie Ren, Shanghai (CN); Jin Xu, Shanghai (CN)

(73) Assignee: Honeywell International Inc., Charlotte, NC (US)

( * ) Notice: Subject to any disclaimer, the term of this patent is extended or adjusted under 35 U.S.C. 154(b) by 81 days.

(21) Appl. No.: 18/764,700

(22) Filed: Jul. 5, 2024

(65) Prior Publication Data

US 2026/0008547 A1 Jan. 8, 2026

(51) Int. Cl.
*B64D 13/00* (2006.01)
*B60T 5/00* (2006.01)
(Continued)

(52) U.S. Cl.
CPC .............. *B64D 13/006* (2013.01); *B60T 5/00* (2013.01); *B64C 25/42* (2013.01); *B64D 13/06* (2013.01); *F28D 2021/0021* (2013.01)

(58) Field of Classification Search
CPC .................. B64D 13/006; B64D 13/06; B64D 2013/0603; B60T 5/00; B60T 17/22;
(Continued)

(56) References Cited

U.S. PATENT DOCUMENTS

| | | | | | |
|---|---|---|---|---|---|
| 2,148,818 | A | * | 2/1939 | Kattwinkel | B61H 5/00 188/71.6 |
| 3,301,357 | A | * | 1/1967 | Cleminson | B60B 19/10 301/6.2 |

(Continued)

FOREIGN PATENT DOCUMENTS

| | | |
|---|---|---|
| CN | 215851865 U | 2/2022 |
| EP | 3995368 A1 | 5/2022 |

(Continued)

OTHER PUBLICATIONS

"Chapter Two—Environmental Control," The Airliner Cabin Environment and the Health of Passengers and Crew, The National Academies Press, 2002 (Applicant points out, in accordance with MPEP 609.04(a), that the year of publication, 2002, is sufficiently earlier than the effective U.S. filing date, so that the particular month of publication is not in issue.), 47 pp.

(Continued)

*Primary Examiner* — Jon T. Schermerhorn, Jr.
(74) *Attorney, Agent, or Firm* — Shumaker & Sieffert, P.A.

(57) ABSTRACT
In some examples, a system includes a conduit configured to receive a cooled air flow produced by an air conditioning pack of a vehicle, such as an aircraft, and deliver the cooled air flow to an interior volume defined by the vehicle, such as an interior volume defined by a hollow axle of a landing gear assembly. The conduit may receive the cooled air flow from one or more compartments of the vehicle and/or an ECS of the vehicle. The conduit is configured to deliver the cooled (Continued)

air flow to provide cooling to one or more components within the interior volume.

20 Claims, 5 Drawing Sheets

(51) Int. Cl.
| | | |
|---|---|---|
| *B64C 25/42* | (2006.01) | |
| *B64D 13/06* | (2006.01) | |
| *F28D 21/00* | (2006.01) | |

(58) Field of Classification Search
CPC ....... B64C 25/42; F16D 65/84; F16D 65/847; F28D 2021/0021
USPC ......................................................... 165/41
See application file for complete search history.

(56) References Cited

U.S. PATENT DOCUMENTS

| | | | | | |
|---|---|---|---|---|---|
| 3,664,467 | A | * | 5/1972 | Lucien | .................. F16D 65/847 188/71.6 |
| 4,130,187 | A | * | 12/1978 | Midolo | ................. F16D 65/853 188/71.6 |
| 5,215,168 | A | * | 6/1993 | Guiot | ....................... B61H 5/00 188/71.6 |
| 9,573,567 | B2 | * | 2/2017 | Kirkbride | ............... B64C 25/42 |
| 9,573,570 | B2 | * | 2/2017 | Mueller | .................... B60T 5/00 |
| 10,597,148 | B2 | | 3/2020 | Meinel | |
| 10,935,093 | B2 | | 3/2021 | Hosamane et al. | |
| 11,441,628 | B2 | | 9/2022 | Ganesh et al. | |
| 11,884,250 | B2 | | 1/2024 | Ke et al. | |
| 11,933,378 | B2 | * | 3/2024 | Nagaraja | ................. F16D 55/40 |
| 2014/0239121 | A1 | | 8/2014 | Kirkbride et al. | |
| 2014/0345991 | A1 | * | 11/2014 | Zywiak | ................ B64D 13/006 188/264 R |
| 2019/0112037 | A1 | | 4/2019 | Meinel Cheesman | |
| 2024/0190396 | A1 | * | 6/2024 | Siddarahally Vajrachari | .............. B64D 13/06 |
| 2025/0250003 | A1 | | 8/2025 | Blanpain et al. | |

FOREIGN PATENT DOCUMENTS

| | | | |
|---|---|---|---|
| EP | 4354107 | A1 | 4/2024 |
| EP | 4382312 | A1 | 6/2024 |
| FR | 2718850 | A1 | 10/1995 |
| FR | 2749559 | A1 | 12/1997 |
| WO | 2023187207 | A1 | 10/2023 |

OTHER PUBLICATIONS

Extended Search Report from counterpart European Application No. 25184412.2 dated Jul. 18, 2025, 10 pp.
Response to Extended Search Report dated Jul. 18, 2025, from counterpart European Application No. 25184412.2 filed Jan. 27, 2026, 21 pp.

* cited by examiner

RECEIVING, USING A CONDUIT, A COOLED AIR FLOW FROM AN AIR CONDITIONING PACK OF A VEHCLE.

502

DISCHARGING, USING THE CONDUIT AND A VALVE CONTROLLED BY CONTROL CIRCUITRY, THE COOLED AIR FLOW TO AN INTERNAL VOLUME DEFINED BY THE VEHICLE.

504

VEHICLE COOLING SYSTEM

TECHNICAL FIELD

The present disclosure relates to cooling systems, such as cooling systems onboard an aircraft.

BACKGROUND

Vehicles, such as aircraft, may include an environmental control system (ECS). The ECS may supply a vehicle with air and may provide climate control (e.g., temperature and pressure) within one or more compartments of the vehicle. In the case of an aircraft, the ECS may receive an air flow from one or more aircraft engines, an auxiliary power unit (APU), or a ground cart and condition the air flow prior to providing the air flow to the compartment. In examples, the ECS cools the air flow and provides for recirculation among the compartments of the vehicle. In some examples, the ECS may provide pressurization to the aircraft interior for the comfort and/or safety of passengers and crew.

SUMMARY

The disclosure describes devices and systems configured to cool one or more components of a vehicle using cooled air flow, and related methods. In examples described herein, a cooling system includes a conduit configured to receive a cooled air flow produced by an air conditioning pack of a vehicle, such as an aircraft. The air conditioning pack may be configured to receive an air flow from an environmental control system (ECS) of the vehicle and provide the cooled air flow to one or more compartments of the vehicle. The conduit may receive the cooled air flow from one or more of the compartments and deliver the cooled air flow to an assembly of the vehicle, such as a landing gear assembly. In examples, the conduit is configured to deliver the cooled air flow to an internal volume defined within an assemblage (e.g., an axle assembly) of the landing gear assembly to, for example, provide cooling to one or more components within the internal volume. The conduit may be configured to deliver the cooled air flow to the internal volume when the assembly (e.g., the landing gear assembly) is in a first configuration such as a lowered configuration, in a second configuration such as a raised configuration, and/or is transitioning between the first configuration and the second configuration.

The system further comprises a valve configured to control a flow rate of the cooled air flow through the conduit and control circuitry configured to control the valve. The system may include a user input device operable by a crew member (e.g., a pilot) of the vehicle. In response to receiving user input via the user input device, the control circuitry can control (e.g., open or shut) the valve, such that cooling of the components within the internal volume may be commenced, ceased, or otherwise controlled.

In some examples, an assembly comprises: a conduit configured to provide cooling to one or more components within an interior volume defined by a hollow axle of an aircraft, wherein the conduit is configured to receive a cooled air flow produced by an air conditioning pack of the aircraft, wherein the conduit is configured to mechanically connect to a strut of a landing gear of the aircraft, and wherein the conduit is configured to discharge the cooled air flow to a volume defined by the landing gear, wherein the volume is in fluidic communication with the interior volume defined by the hollow axle; a valve configured to control a flow rate of the cooled air flow provided by the conduit; and control circuitry configured to control the valve.

In some examples, an assembly comprises: a conduit configured to provide a cooled air flow to one or more components within an interior volume defined by a hollow axle of an aircraft; an air conditioning pack configured to cool an air flow to produce the cooled air flow, wherein the conduit is configured to mechanically connect to a strut of a landing gear of the aircraft, the conduit configured to fluidically couple with at least one of a compartment of the aircraft, a mixing manifold of the aircraft, an air distribution system of the aircraft, an air return system of the aircraft, or a pack discharge of the air conditioning pack, and wherein the conduit is configured to discharge the cooled air flow to a volume defined by the landing gear of the aircraft, wherein the volume is in fluidic communication with the interior volume defined by the hollow axle; a valve configured to control a flow rate of the cooled air flow provided by the conduit; control circuitry configured to control the valve; and at least one of: a turbine engine of the aircraft, or a power unit of the aircraft, wherein the turbine engine or the power unit is configured to provide an air flow to the air conditioning pack, and wherein the cooled air flow comprises the air flow.

In some examples, a method comprises: receiving, using a conduit mechanically connected to a strut of a landing gear of an aircraft, a cooled air flow provided by an air conditioning pack of the aircraft; and discharging, from the conduit and using a valve configured to control a flow rate of the cooled air flow provided by the conduit, the cooled air flow to a volume defined by the landing gear of the aircraft to provide cooling to one or more components within an interior volume defined by a hollow axle of the aircraft, wherein the volume is in fluidic communication with the interior volume.

The details of one or more examples are set forth in the accompanying drawings and the description below. Other features, objects, and advantages will be apparent from the description and drawings, and from the claims.

DETAILED DESCRIPTION

Figure 1:
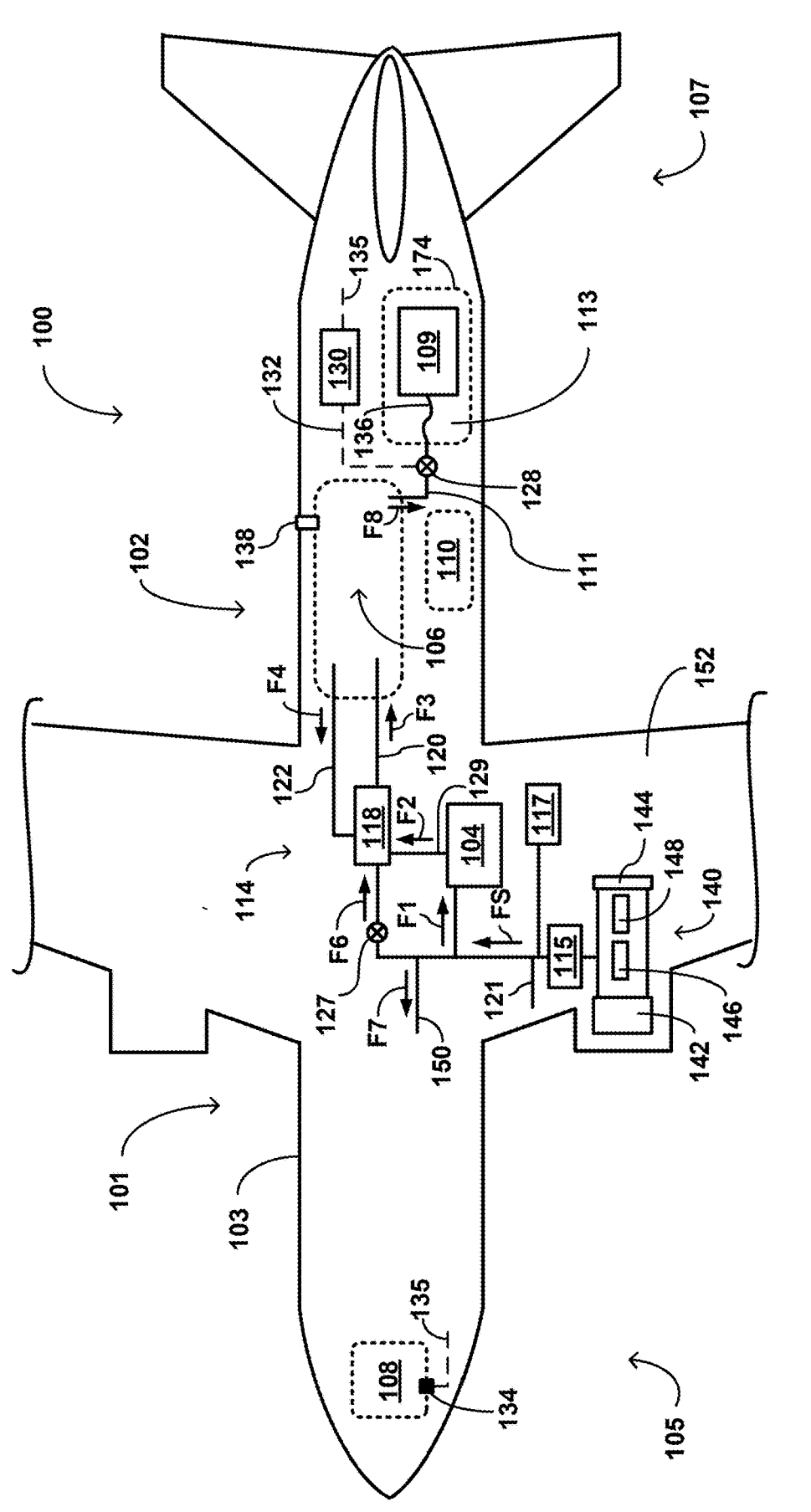
FIG. 1 is a schematic illustration of a portion of a vehicle including an air conditioning pack configured to deliver a cooled air flow to one or more compartments of the vehicle.

The present disclosure describes a system configured to provide a cooled air flow to one or more components of an assembly of a vehicle, such as an aircraft. In some examples, the system is configured to provide the cooled air flow to an interior volume defined by a landing gear assembly of the aircraft. For example, the system may deliver the cooled air flow to an interior volume defined by an assemblage (e.g., an axle assembly, such as a hollow axle) of the landing gear assembly to provide cooling to one or more components within the interior volume, such as a speed sensor configured to determine a rotational speed of a wheel of the vehicle, one or more cables (e.g., power cables), and/or other components.

In some examples, the assemblage of the vehicle supports or is in close proximity to a brake assembly of the vehicle, such that the interior volume receives heat generated by the brake assembly. For example, during braking operations, frictional engagement between rotor discs and stator discs of the brake assembly may generate heat. The assemblage and other components of the vehicle (e.g., other components of the assemblage) may act to transfer the heat from the brake assembly and into the interior volume, tending to increase a temperature of the interior volume and the one or more components of vehicle supported therein. The system may provide the cooled air flow to the interior volume to, for example, limit and/or mitigate the temperature increase experienced by the interior volume and/or the components during and following a braking operation.

The system includes a valve configured to control the flow of the cooled air flow through the conduit to the interior volume, such that cooling of the components within the internal volume may be commenced, ceased, or otherwise controlled based on the state of the valve. The system includes control circuitry configured to control the valve (e.g., control a position of the valve to control a state of the valve). In some examples, the control circuitry is configured to control the valve based on one or more indications, such as a temperature indication, provided by sensor of the vehicle. In some examples, the system includes a user input device configured to cause the control circuitry to control the valve (e.g., to cause the valve to open, shut, or alter its position). The user input device (e.g., a switch) may be operable by, for example, a crew member (e.g., a pilot), such that the crew member may control the cooling provided to the interior volume.

The system (e.g., the conduit) is configured to receive the cooled air flow from a system onboard the vehicle, such as an air conditioning pack. Hence, the system may be controlled by crew to provide cooling to the interior volume (e.g., an interior volume defined by an assemblage of the landing gear assembly such as an axle assembly). The system may be used to reduce a risk of overheating and provide a more friendly environment to equipment (e.g., electrical equipment) positioned within the interior volume and/or to components defining the interior volume. This improve the reliability and operational lifetime of the equipment and/or the components.

Further, with the system configured to receive the cooled air flow from a system onboard the vehicle, the system may provide cooling to an interior volume following a take-off of the aircraft (e.g., to dissipate heat generated by the brake system during taxi and take-off). This may reduce the time that the components within the interior volume are exposed to higher temperatures, prolonging an operational life of the components. In examples, the conduit of the system is configured to remain fluidly connected to an interior volume defined by a landing gear assembly as the landing gear assembly is translated (e.g., as the landing gear assembly is raised and/or lowered), such that the system requires minimal or no set-up to provide cooling when desired (e.g., following an aircraft landing and/or take-off).

In examples, the vehicle is an aircraft which includes an environmental control system (ECS) configured to supply a cooled air flow to compartments of the aircraft, such as a passenger cabin, a flight deck, a cargo hold, a galley, a lavatory, and/or other compartments of the aircraft. The ECS may be configured to receive an air flow from a bleed system of the aircraft, an auxiliary power unit (APU) of the aircraft, or some other system of the aircraft. The ECS may include one or more air conditioning packs configured to receive some portion of the air flow and reduce a temperature to the air flow to produce the cooled air flow. The ECS may be configured to distribute the cooled air flow to one or more of the compartments. In examples, the ECS is configured to substantially recirculate air among at least some of the compartments and add the cooled air flow to the recirculating flow (e.g., using a mixing manifold). For example, the ECS may include an air distribution system configured to distribute supply air including the cooled air stream to the compartments. The ECS may include an air return system (e.g., an air ventilation system) configured withdraw return air from one or more of the compartments and deliver the return air to the ECS (e.g., to the mixing manifold). The ECS may mix the return air and the cooled air flow (e.g., using the manifold) and provide the mixture as the supply air to, for example, assist in substantially establishing and/or maintaining a relative homogeneity among the atmospheres of the compartments. Hence, the supply air may be comprised of at least some portion of the cooled air flow produced by the air conditioning pack.

In some examples, the conduit of the system is configured to receive the cooled air flow produced by the air conditioning pack via direct or indirect fluidic coupling with one or more compartments and/or systems of the aircraft configured to receive the supply air. For example, the conduit may be configured to receive the cooled air flow from one of more of the compartments of the vehicle (e.g., one or more of the cabin, flight deck, cargo holds, and/or other compartments of the vehicle). In some examples, the conduit may receive the cooled air flow from one or more portions of the ECS, such as the air distribution system, the air return system, the mixing manifold, and/or another portion of the ECS. The conduit is configured to discharge the cooled air flow received to the interior volume at a flow rate based on a position and/or disposition of the valve of the system. In examples, the system may be configured to flow the cooled air flow through the interior volume and subsequently exhaust the cooled air flow to an atmosphere surrounding the aircraft (e.g., through an end cap attached to an axle assembly and/or an axle).

While an aircraft is primarily referred to herein, the cooling devices, systems, and methods described herein can be used with other vehicles, including marine vehicles and/or land vehicles.

FIG. 1 schematically illustrates an example system 100 configured to provide a cooled air flow to an interior volume defined by a vehicle 101. In examples, vehicle 101 (e.g., an aircraft) including an air conditioning pack 104 and an assembly 109 (e.g., a landing gear assembly). Vehicle 101 includes one or more compartments 102 ("compartments 102"), such as cabin 106, flight deck 108, cargo hold 110, and/or other compartments of vehicle 101 (e.g., one or more galleys, lavatories, and/or other compartments). In examples, vehicle 101 includes a fuselage 103 extending from a forward portion 105 of vehicle 101 to an aft portion 107 of vehicle 101. Compartments 102 are supported by and/or housed within fuselage 103.

Figure 2:
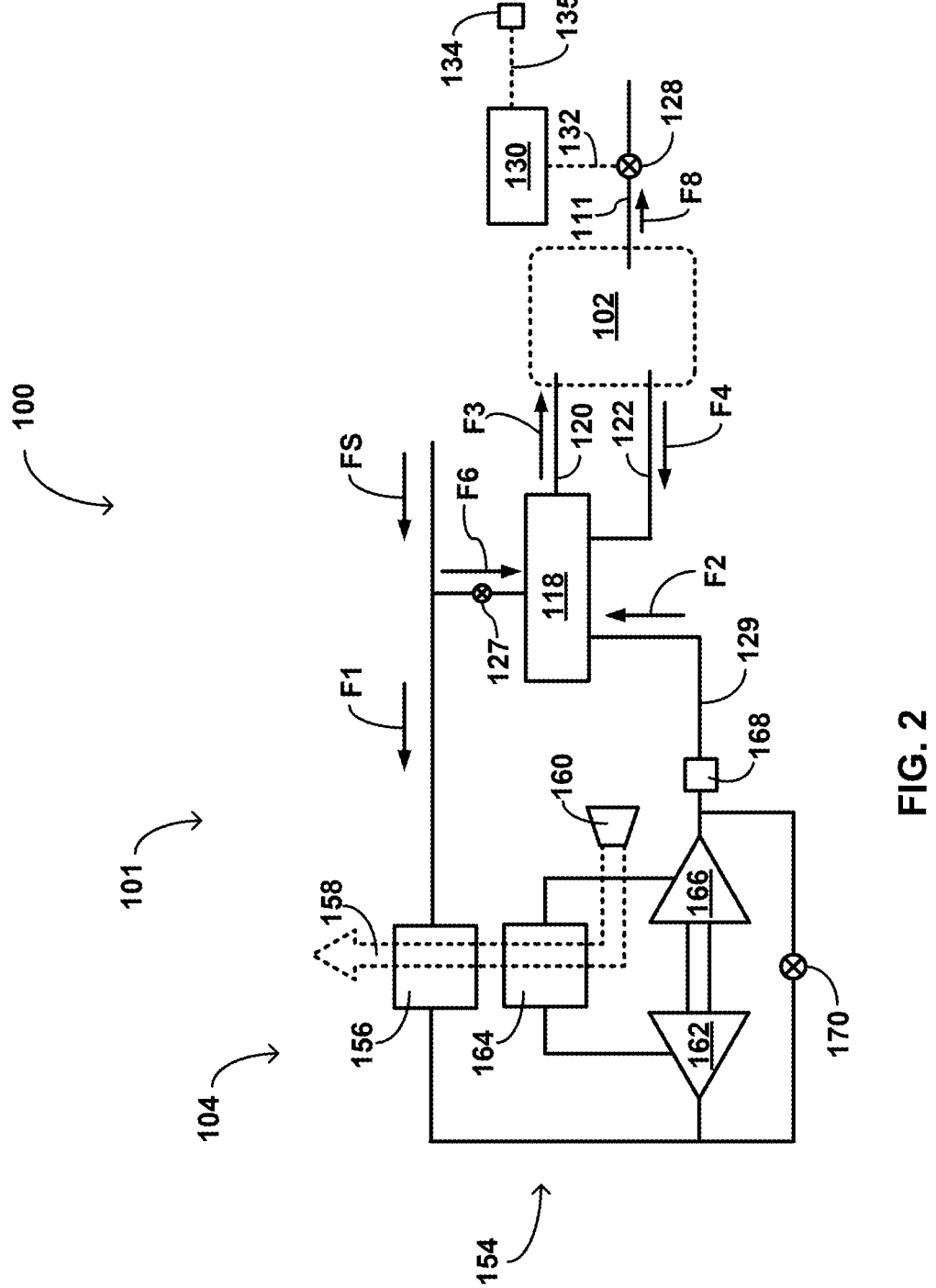
FIG. 2 is a schematic illustration of an example air conditioning pack configured to provide the cooled air flow to the one or more compartments of the vehicle.
Figure 3:
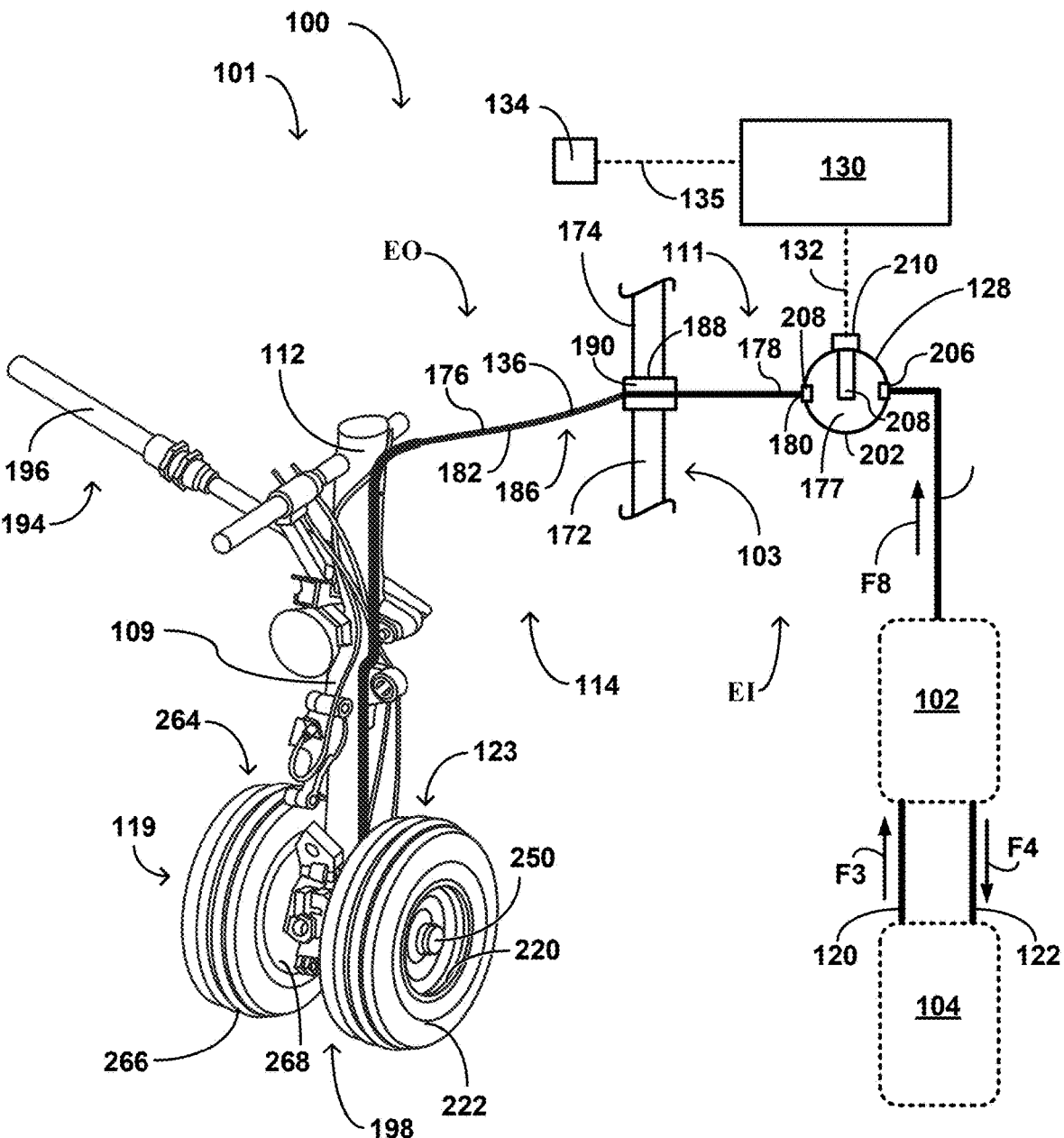
FIG. 3 is a schematic illustration of a conduit attached to a strut of a landing gear assembly and configured to deliver a portion of a cooled air flow to an interior volume defined by the landing gear assembly.
Figure 4:
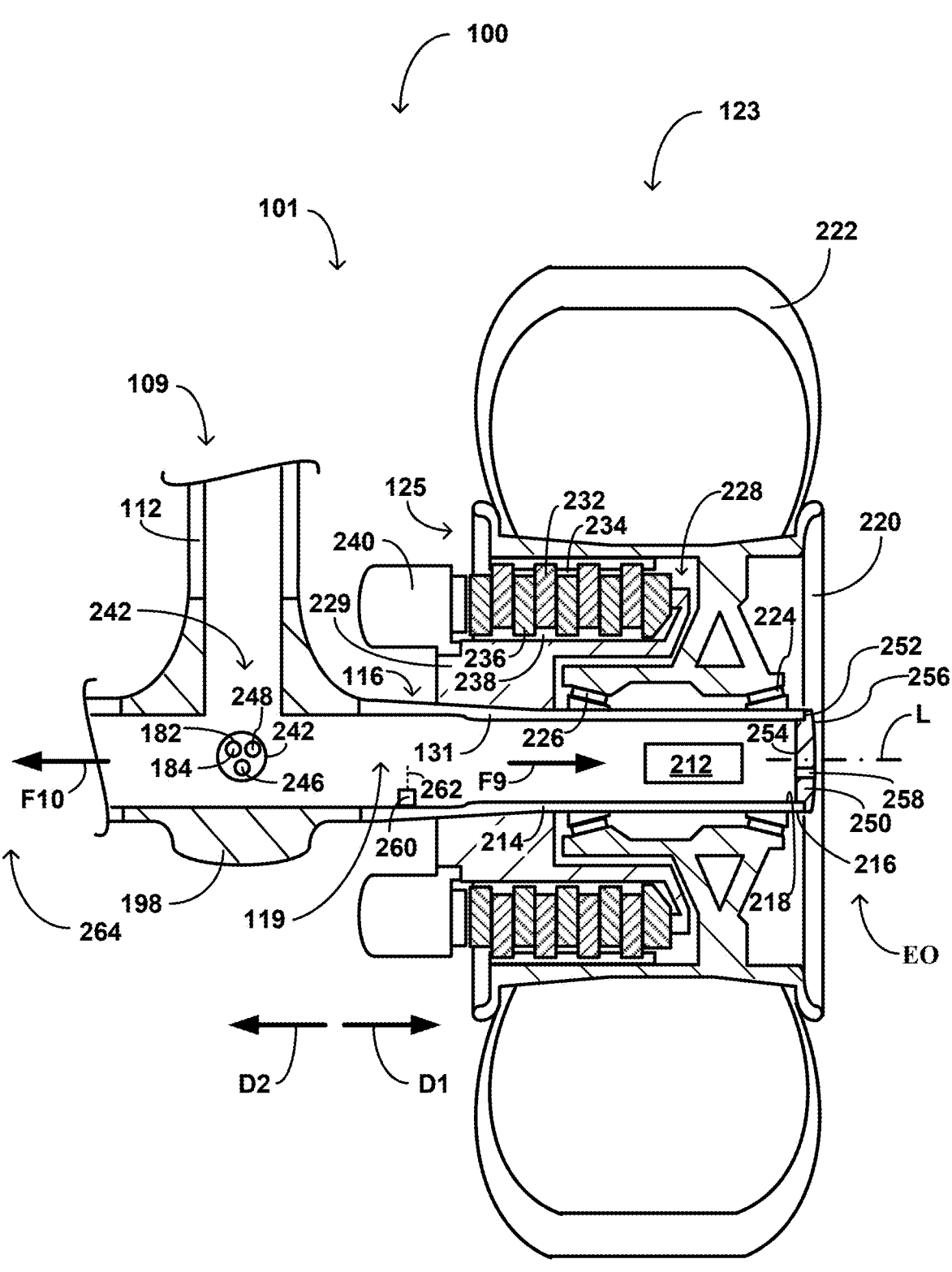
FIG. 4 is a schematic illustration of a conduit configured to deliver a cooled air flow to an interior volume defined by an assemblage of the landing gear assembly, with the assemblage and portions of a braking system illustrated as cross-sections with a cutting plane taken parallel to the page.

FIG. 2 schematically illustrates an example air conditioning pack 104 configured to provide a cooled air flow to compartments 102. FIG. 3 schematically illustrates an example conduit 111 attached to a strut 112 of example assembly 109 and configured to deliver the cooled air flow to an interior volume defined by assembly 109. FIG. 4 schematically illustrates an assemblage 116 (e.g., an axle assembly) of assembly 109 defining an interior volume 119 of assembly 109, with assembly 109 and portions of a brake assembly 125 shown as cross-sections with a cutting plane parallel to the page and, e.g., through a central longitudinal axis L of assemblage 116.

In examples, assembly 109 is configured to position relative to a bay 113 (e.g., a landing gear bay) of vehicle 101. For example, assembly 109 may be configured to establish a first orientation (e.g., a lowered configuration) relative to bay 113 and configured to establish a second orientation (e.g., a raised configuration) relative to bay 113. Assembly 109 may be configured to transition from the first orientation to the second orientation (e.g., during a takeoff of vehicle 101) and/or transition from the second orientation to the first orientation (e.g., during a landing of vehicle 101). In examples, conduit 111 is configured to deliver the cooled air flow to interior volume 119 when assembly 109 is in the first orientation, when assembly 109 is in the second orientation, and when assembly 109 transitions between the first configuration and the second configuration.

In the example shown in FIGS. 1-4, conduit 111 is configured to provide cooling for one or more components within the interior volume defined by assembly 109 (e.g., interior volume 119), such as a speed sensor configured to sense a rotational speed of a wheel 123 of vehicle 101 (FIG. 2, FIG. 3), one or more cables extending through the interior volume defined by assembly 109 (e.g., interior volume 119), one or more components of brake assembly 125 of vehicle 2 (FIG. 4), and/or other components of vehicle 101.

Vehicle 101 includes an environmental control system 114 ("ECS 114"). ECS 114 is configured to provide a cooled air flow into and throughout compartments 102 of vehicle 101. In examples, ECS 114 is configured to receive an air flow from a bleed system 115. In some examples, in addition to or instead of bleed system 115, ECS 114 is configured to receive an air flow from a power unit 117 (e.g., an auxiliary power unit (APU) or other system of vehicle 101). In some examples, ECS 114 may be configured to receive an air flow from a connection 121 (e.g., a ground connection). For example, ECS 114 may be configured to receive an air flow FS from bleed system 115, power unit 117, and/or connection 121, which are each described in further detail below.

ECS 114 includes one or more air conditioning packs such as an air conditioning pack 104 ("pack 104"). Pack 104 is configured to receive some portion of the air flow FS (e.g., flow F1) from bleed system 115, power unit 117, and/or connection 121. Pack 104 is configured to cool the air flow, e.g., using compression and expansion of the air flow (e.g., using air cycle machine 154 (FIG. 2)). In some examples, pack 104 may be configured to cool the air flow by causing the air flow to exchange heat with a heat transfer fluid, such as a refrigerant fluid and/or another air flow (e.g., a ram air flow). Pack 104 is configured to receive the portion of the air flow (e.g., flow F1) from bleed system 115, power unit 117, and/or connection 121 and cool the air flow to provide a cooled air flow (e.g., flow F2). Pack 104 is configured to provide the cooled air flow (e.g., flow F2) to compartments 102 of vehicle 101, such as cabin 106, flight deck 108, cargo hold 110, and/or other compartments of vehicle 101. In examples, pack 104 is configured to issue the cooled air flow (e.g., flow F2) using a pack discharge 129. Pack discharge 129 may be, for example, an outlet of pack 104, a conduit fluidically coupling pack 104 and another portion of ECS 114, or another structure through which pack 104 issues the cooled air flow.

In some examples, ECS 114 is configured to substantially recirculate air among compartments 102 of vehicle 101. ECS 114 may be configured to add the cooled air flow from pack 104 to the recirculating flow. For example, ECS 114 may include one or more mixing manifolds such as a mixing manifold 118. Mixing manifold 118 may be configured to provide a supply air (e.g., flow F3) to one or more of compartments 102. Mixing manifold 118 may be configured to receive a return air (e.g., flow F4) from one or more of compartments 102. For example, mixing manifold 118 may be configured to receive a first portion of the return air from cabin 106, a second portion of the return air from flight deck 108, a third portion of the return air from cargo hold 110, and/or another portion of the return air from another of compartments 102. Mixing manifold 118 may be configured to mix the portions of the return air and provide at least a portion of the mixed return air as supply air (e.g., flow F3) to, for example, assist in substantially establishing and/or maintaining a relative homogeneity among the atmospheres in compartments 102.

In some examples, ECS 114 (e.g., pack 104) is configured to provide the cooled air flow (e.g., flow F2) to mixing manifold 118. Mixing manifold 118 may be configured to mix the cooled air flow with the first portion of the return air from cabin 106, the second portion of the return air from flight deck 108, the third portion of the return air from cargo hold 110, and/or the other portion of the return air from the other of compartments 102, such that the supply air (e.g., flow F3) comprises the mixed return air and the cooled air flow.

In some examples, ECS 114 includes an air distribution system 120 configured to distribute the supply air (e.g., from mixing manifold 118). Air distribution system 120 may include a variety of components for transporting and dispersing the supply air into compartments 102 including, but not limited to supply ducting, supply air vents, gaspers, and the like. The supply ducting, supply air vents, gaspers, and the like may be distributed throughout compartments 102. For example, a portion of the supply ducting, supply air vents, gaspers, and the like may be distributed within and/or configured to provide a first portion of the supply air to cabin 106. Another portion of the supply ducting, supply air vents, gaspers, and the like may be distributed within and/or configured to provide a second portion of the supply air to flight deck 108. An additional portion of the supply ducting, supply air vents, gaspers, and the like may be distributed within and/or configured to provide a third portion of the supply air to cargo hold 110. Others portions of the supply ducting, supply air vents, gaspers, and the like may be distributed within and/or configured to provide additional portions of the supply air to other compartments of vehicle 101.

ECS 114 may include an air return system 122 configured withdraw the return air (e.g., flow F4) from one or more of compartments 102. Air return system 122 may be configured to provide the return air to ECS 114 (e.g., mixing manifold 118). Air return system 122 may include a variety of components for withdrawing the return air from compartments 102 and returning the return air to ECS 114, including, but not limited to return ducting, return air vents, recirculation fans, and the like, which may be distributed throughout compartments 102. For example, a portion of the return ducting, return air vents, recirculation fans, and the like may be distributed within and/or configured to withdraw the first portion of the return air from cabin 106 and return the first portion to ECS 114. Another portion of the return ducting, return air vents, recirculation fans, and the like may be distributed within and/or configured to withdraw the second portion of the return air from flight deck 108 and return the second portion to ECS 114. An additional portion of the return ducting, return air vents, recirculation fans, and the like may be distributed within and/or configured to withdraw the third portion of the return air from cargo hold 110 and provide the third portion to ECS 114. Others portions of the return ducting, return air vents, recirculation fans, and the like may be distributed within and/or configured to withdraw the other portion of the return air from other compartments of compartments 102 and provide the other portion to ECS 114.

In examples, ECS 114 is configured to provide a trim air (e.g., flow F6) to mixing manifold 118 to, for example, control a temperature of the supply air (e.g., flow F3). The trim air may be a portion of air flow FS. ECS 114 may be configured such that the trim air substantially bypasses at least some portion of pack 104. Hence, the trim air may have a higher temperature than the cooled air flow provided by pack 104. ECS 114 may be configured to substantially control the temperature of the supply air by at least mixing the trim air (e.g., using mixing manifold 118) with the cooled air flow (e.g., flow F2). In examples, ECS 114 includes one or more trim valves such as trim valve 127 configured to control a flow of the trim air to mixing manifold 118. A position of trim valve 127 may be controlled by a thermostat and/or members of the flight crew to control a temperature of the supply air.

ECS 114 may include a plurality of trim valves such as trim valve 127 and a plurality of mixing manifolds such as mixing manifold 118 to enable separate temperature control of some of or each of compartments 102. For example, ECS 114 may include trim valve 127 and/or mixing manifold 118 configured to control a temperature of the first portion of supply air provided to cabin 106, include a second trim valve and/or a second mixing manifold configured to control a temperature of the second portion of the supply air to flight deck 108, and/or include a third trim valve and/or a third mixing manifold configured to control a temperature of the third portion of the supply air to cargo hold 110. ECS 114 may include any number of trim valves and/or mixing manifolds.

System 100 is configured to provide cooling to one or more components of assembly 109. System 100 includes conduit 111. In examples, system 100 is configured to provide cooling to an interior volume defined by assembly 109. In some examples, system 100 is configured to provide cooling to interior volume 119 defined by assemblage 116 (FIG. 4). System 100 may be configured to provide cooled air flow (e.g., at least some portion of flow F2) to the interior volume to provide cooling to one or more components supported within the interior volume, such as one or more speed sensors configured to sense a rotational speed of wheel 123, one or more cables extending through interior volume 119, one or more components of brake assembly 125, and/or other components.

Conduit 111 is configured to receive cooled air flow (e.g., at least some portion of flow F2) issued from pack 104. Conduit 111 may be configured to receive the cooled air flow directly or indirectly from pack 104. For example, conduit 111 may be configured to receive the cooled air flow from any portion of vehicle 101 which is configured to receive some portion of the cooled air flow (e.g., flow F2) issued by pack 104. For example, in some examples, conduit 111 may directly or indirectly receive the cooled air flow from one or more portions of ECS 114, such as air distribution system 120, air return system 122, mixing manifold 118, pack discharge 129, and/or another portion of ECS 114. In some examples, conduit 111 may directly or indirectly receive the cooled air flow from one of more of compartments 102 (e.g., one or more of cabin 106, flight deck 108, cargo hold 110, and/or other compartments of vehicle 101). In some examples, conduit 111 is configured to receive the cooled air flow from a portion of vehicle 101 configured to fluidically couple to pack discharge 129.

As used here, when a portion of vehicle 101 fluidically couples with pack discharge 129, this may mean the portion of vehicle 101 receives at least some portion of flow F2 via a flow path defined at least partially by pack discharge 129. The flow path may extend from pack discharge 129 to the portion of vehicle 101. In some examples, the flow path extends through and/or is partially defined by other portions of vehicle 101, such as air distribution system 120, air return system 122, mixing manifold 118, other portions of ECS 114, cabin 106, flight deck 108, cargo hold 110, other compartments of vehicle 101, and/or other portions of vehicle 101. For example, when conduit 111 indirectly receives the cooled air flow from pack discharge 129 and/or pack 104, conduit 111 may receive the cooled air flow from cabin 106, flight deck 108, cargo hold 110, other compartments of vehicle 101, air distribution system 120, air return system 122, mixing manifold 118, other portions of ECS 114, and/or other portions of vehicle 101 to which pack discharge 129 and/or pack 104 supply the cooled air flow.

Conduit 111 is configured to discharge the cooled air flow (e.g., flow F8) to the interior volume defined by assembly 109 to, for example, provide cooling to one or more components supported within the interior volume. In some examples, system 100 includes a valve 128 configured to control a flow rate of the cooled air flow discharged into the interior volume from conduit 111. In examples, system 100 includes control circuitry 130 configured to control and/or adjust a position of valve 128 (e.g., via a communication link 132). System 100 may include a user input device (e.g., a switch, button, touchscreen, or the like) operable by, for example, a flight crew member or maintenance member and configured to cause control circuitry 130 to control and/or adjust the position of valve 128. For example, system 100 may include user input device 134 (e.g., located in flight deck 108) via which a user can provide input, which is transmitted to control circuitry 130 (e.g., via communication link 135). In response to receiving the user input, control circuitry 130 controls and/or adjusts a position of valve 128 based on an action indicated by the user input. In some examples, control circuitry 130 may be configured to control and/or adjust a position of valve 128 based on a signal from a sensor, such as a temperature sensor (e.g., sensor 260 (FIG. 4)) positioned within and/or in proximity to the interior volume defined by assembly 109.

In examples, conduit 111 includes a flexible portion 136 configured to flex and/or bend when assembly 109 transitions between the first orientation relative to bay 113 (e.g., the lowered configuration) and the second orientation relative to bay 113 (e.g., the raised configuration). Hence, conduit 111 may be configured to provide cooling to the interior volume defined by a landing gear assembly when the landing gear assembly is raised and positioned within a landing gear bay (e.g., when in the raised configuration), when the landing gear assembly is lowered and extended from the landing gear bay (e.g., when in the lowered configuration) and/or when the landing gear assembly is transitioning between the raised configuration and the lowered configuration. In some examples, at least flexible portion 136 may extend within bay 113. In some examples, for example when assembly 109 includes a landing gear assembly of an aircraft, conduit 111 (e.g., flexible portion 136) is configured to mechanically connect to a strut of the landing gear assembly.

ECS 114 may be configured to pressurize one or more of compartments 102 (e.g., at least cabin 106, flight deck 108, cargo hold 110, and/or other compartments) using air flow FS provided by air bleed system 115, power unit 117, and/or connection 121. In examples, ECS 114 is configured to control a pressure of one or more of compartments 102 using one or more outflow valves such as outflow valve 138. Outflow valve 138 may be configured to discharge air from one or more of compartments 102 to an environment outside of vehicle 101 (e.g., an ambient environment surrounding vehicle 101) to control the pressure in compartments 102. In some examples, outflow valve 138 is a thrust recovery valve. ECS 114 may include any number of outflow valves such as outflow valve 138. Any of the outflow valves may be configured to discharge air from one or more of compartments 102 to an environment surrounding vehicle 101.

Bleed system 115 may be configured to receive an air flow from an engine 140 of vehicle 101. Engine 140 may be configured to intake an intake air flow via a fan section 142 and exhaust at least a first portion of the intake air flow through an exhaust section 144 (e.g., to generate engine thrust for vehicle 101 during takeoff and flight). Engine 140 may be configured to use a second portion of the intake air flow to support combustion of a fuel and generate power (e.g., mechanical power). For example, engine 140 may be configured to compress the second portion using a compressor section 146 to generate a compressed air flow. Engine 140 may be configured to mix a portion of the compressed air flow and a fuel to cause a combustion in a combustion section 148 to generate the power. Engine 140 may be configured to transfer some portion of the generated power to fan section 142 to cause fan section 142 to continue the intake of the intake air flow. Vehicle 101 may include any number of engines such as engine 140 configured to generate engine thrust on vehicle 101.

Bleed system 115 may be configured to divert some amount of the compressed air flow from compressor section 146 prior to the compressed air flow entering combustion section 148. In some examples, bleed system 115 is configured to extract the compressed air flow gas from multiple compressor stages of compressor section 146, such as lower pressure air from a lower pressure compressor stage and/or a higher pressure air from a higher pressure compressor stage. Bleed system 115 may be configured to provide the air flow FS to ECS 114 using the compressed air received from compressor section 146. In some examples, bleed system 115 includes a pre-cooler (not shown) configured to reduce a temperature of the compressed air flow received from compressor section 146. The pre-cooler may be configured to subsequently provide air flow FS to ECS 114. In examples, the pre-cooler is configured to cause a heat exchange between the compressed air flow received from compressor section 146 and a heat exchange fluid, such as a second air flow received by vehicle 101 via a ram air scoop (e.g., while in flight) or a second air flow driven by a fan (e.g., when grounded).

Vehicle 101 may include power unit 117 (e.g., in addition to or instead of engine 140 and/or bleed system 115). In examples, power unit 117 is an auxiliary power unit (APU). In examples, the APU is a gas turbine configured to produce and supply electric power to one or more systems and/or components of vehicle 101. In examples, the APU is configured to supply air flow FS when engine 140 is not running (e.g., when vehicle 101 is waiting at a gate) and/or when engine 140 is not producing power adequate to generate the electric power and/or air flow FS requirements of vehicle 101. In some examples, power unit 117 is located in aft portion 107 of vehicle 101.

Connection 121 (e.g., a high pressure (HP) connection and/or a low pressure (LP) connection) may be configured to receive air and/or other fluids from supply sources outside ECS 114 and/or vehicle 101 and provide the air and/or other fluids to ECS 114. In some examples, connection 121 is accessible from outside vehicle 101 and configured to receive the air and/or other fluids while vehicle 101 is grounded. For example, connection 121 may be configured to couple to one or more pieces of machinery, such as a ground cart, configured to supply the air and/or other fluids air to ECS 114 (e.g., mixing manifold 118). In some examples, connection 121 is accessible from inside vehicle 101 and configured to receive air while vehicle 101 is grounded or in flight. For example, connection 121 may be configured to couple to one or more pieces of machinery configured to supply the air and/or other fluids to ECS 114 (e.g., mixing manifold 118).

In examples, vehicle 101 is configured to provide some portion of air flow FS (e.g., a portion of air flow FS not received by ECS 114) to one or more gas loads. For example, vehicle 101 may include a supply conduit 150 configured to provide the portion of air flow FS (e.g., flow F7) to the one or more gas loads. In some examples, the one or more gas loads includes an Air Drive Unit (ADU) configured to pressurize a hydraulic system of vehicle 101 to allow, for example, the operation of flaps and other control surfaces of vehicle 101 (e.g., flaps and control surfaces on a wing 152 of vehicle 101). The one or more gas loads may include an anti-icing system (e.g., a wing anti-icing system) configured to remove and/or limit ice on an aircraft wing (e.g., wing 152) or other portion of vehicle 101. In some examples, the one or more gas loads include an inert gas generating system configured to reduce an oxygen concentration of an air flow (e.g., for subsequent use in the pressurization of a fuel tank). Vehicle 101 may be configured to provide (e.g., using supply conduit 150) the portion of air flow FS (e.g., flow F7) to other systems, devices, components, or combination thereof configured to support the operations of vehicle 101. Supply conduit 150 may comprise a single conduit or a plurality of conduits.

In some examples, pack 104 includes an air cycle machine 154 (FIG. 2) configured to produce the cooled air flow (e.g., flow F2). Air cycle machine 154 may be configured to receive a portion of air flow FS (e.g., flow F1) to produce the cooled air flow. In examples, air cycle machine 154 includes a primary heat exchanger 156 configured to exchange heat with flow F1 to, for example, reduce a temperature of flow F1. Primary heat exchanger 156 may be configured to receive flow F1 and receive a secondary air 158. Primary heat exchanger 156 may be configured to cause a heat exchange between flow F1 and secondary air 158.

In some examples, vehicle 101 is configured to receive secondary air 158 using a secondary air inlet 160 (e.g., a ram-air inlet). Secondary air inlet 160 may be configured to substantially face an airflow caused by movement of vehicle 101 in a direction extending from aft portion 107 (FIG. 1) toward forward portion 105. Secondary air inlet 160 may be configured to pressurize secondary air 158 (e.g., using ram pressure) to cause secondary air 158 to flow through primary heat exchanger 156. In some examples, instead of or in addition to secondary air inlet 160, vehicle 101 includes a fan (not shown) or other component configured to cause secondary air 158 to flow through primary heat exchanger 156. For example, when vehicle 101 is an aircraft, vehicle 101 may be configured to pressurize secondary air 158 using ram-pressure generated by secondary air inlet 160 when the aircraft is in motion (e.g., in flight), and configured to pressurize secondary air 158 using the fan when motion of the aircraft is insufficient to generate the ram pressure (e.g., when the aircraft is grounded).

Air cycle machine 154 may be configured to compress flow F1. For examples, air cycle machine 154 may include one or more compressors such as compressor 162 configured to compress flow F1. In examples, compressor 162 is configured to receive flow F1 from primary heat exchanger 156. Air cycle machine 154 may include a secondary heat exchanger 164 configured to cause a second heat exchange between the compressed flow F1 exiting compressor 162 and a cooling fluid, such as secondary air 158. In examples, secondary heat exchanger 164 is configured to cause the second heat exchange to reduce a temperature of the compressed flow F1. For example, secondary heat exchanger 164 may be configured to remove at least some portion of a heat of compression of the compressed flow F1 caused by compressor 162.

In examples, air cycle machine 154 is configured to expand the compressed flow F1 to produce the cooled air flow (e.g., flow F2). Air cycle machine 154 may be configured to expand the compressed flow F1 to cause a reduction (e.g., a further reduction) in a temperature of the compressed flow F1. For examples, air cycle machine 154 may include one or more turbines such as turbine 166 configured to expand the compressed flow F1 to produce an expanded flow F1. In examples, turbine 166 is configured to receive the compressed flow F1 from secondary heat exchanger 164. In examples, turbine 166 is configured to generate power (e.g., mechanical and/or electrical power) when turbine 166 expands the compressed flow F1 to produce the expanded flow F1. Air cycle machine 154 may produce the cooled air flow (e.g., flow F2) using the expanded low F1. For example, turbine 166 may issue the expanded flow F1 to pack discharge 129. The expanded flow F1 may comprise at least a portion of the cooled air flow produced by pack 104.

Pack 104 may include additional components configured to condition flow F1 enroute to producing the cooled air flow, such as component 168. Component 168 may be, for example, a component configured to remove moisture from (e.g., dehumidify) the flow F1 and/or otherwise condition flow F1 enroute to producing the cooled air flow. In examples, pack 104 (e.g., air cycle machine 154) may be configured to cause at least some portion of flow F1 to bypass compressor 162, secondary heat exchanger 164, and/or turbine 166. For example when secondary air 158 is sufficiently cool to produce the cooled air flow (e.g., when vehicle 101 is in flight), pack 104 may be configured to cause the portion of flow F1 to bypass compressor 162, secondary heat exchanger 164, and/or turbine 166 using a bypass valve 170. In examples, bypass valve 170 is configured to port the portion of flow F1 substantially from primary heat exchanger 156 substantially to pack discharge 129.

Although an example air conditioning pack 104 is described with reference to FIG. 2, in other examples, pack 104 can have other configurations.

FIG. 3 schematically illustrates an example conduit 111 attached to assembly 109 of vehicle 101. Conduit 111 is configured to receive the cooled air flow from a portion of vehicle 101, the portion itself also being configured to receive at least some portion of the cooled air flow. For example, conduit 111 may be configured to receive the cooled air flow (e.g., either directly or indirectly) from one or more of compartments 102 (e.g., as depicted in FIG. 3), one or more portions of ECS 114 such as air distribution system 120, air return system 122, mixing manifold 118, pack discharge 129, and/or another portion of ECS 114, and/or another portion of vehicle 101. Conduit 111 is configured to deliver the cooled air flow received to interior volume 119 (FIG. 4) defined by assembly 109. In examples, assembly 109 is a landing gear assembly of vehicle 101. In some examples, interior volume 119 is defined by an assemblage 116 (e.g., a hollow axle od an axle assembly) of assembly 109.

In examples, assembly 109 is configured to move relative to some portion of vehicle 101. For example, assembly 109 may be configured to move relative to a bulkhead 172 (e.g., a pressure bulkhead) comprising a portion of and/or supported by fuselage 103 of vehicle 101. Bulkhead 172 may be configured to maintain an internal atmosphere EI within one or more of compartments 102 greater than or equal to an external atmosphere EO substantially external to and/or surrounding vehicle 101 (e.g., when vehicle 101 is in flight). In some examples, bulkhead 172 is a portion of a boundary 174 substantially defining bay 113 (FIG. 1). For example, when vehicle 101 is an aircraft, bay 113 may be a landing gear bay and boundary 174 may be configured to maintain internal atmosphere EI greater than or equal to external atmosphere EO within the landing gear bay.

In examples, vehicle 101 is configured to substantially maintain and/or establish internal atmosphere EI within one or more pressurized spaces of vehicle 101 (e.g., one or more of compartments 102). Vehicle 101 may be configured to substantially maintain and/or establish external atmosphere EO within one or more unpressurized spaces of vehicle 101 (e.g., bay 113) and/or substantially external to and/or surrounding vehicle 101.

In some examples, conduit 111 is configured to pass through bulkhead 172 to deliver the cooled air flow from one or more of compartments 102 to interior volume 119. In examples, conduit 111 includes a conduit body 176 which includes an inlet portion 178 defining an inlet 180 configured to receive the cooled air flow from valve 128 and/or compartments 102. In examples, inlet portion 178 is configured to position within a pressurized space of vehicle 101. Conduit body 176 may include an outlet portion 182 defining an outlet 184 (FIG. 4) configured to deliver the cooled air flow to interior volume 119. In examples, outlet portion 182 is configured to position within an unpressurized space of vehicle 101 (e.g., within bay 113) and/or within external environment EO. In examples, conduit body 176 defines a flow volume 186 which extends continuously from inlet 180 to outlet 184. For example, conduit body 176 can define a lumen that extends from inlet 180 to outlet 184, the lumen defining a flow path for air flow.

Although inlet 180 is depicted in FIG. 3 as receiving the cooled air flow from valve 128, this is not required in all examples. In some examples, for example when valve 128 is configured to be located with an unpressurized space (e.g., bay 113), and/or when valve 128 is supported by and/or defines a portion of bulkhead 172, inlet 180 may (e.g., more directly) receive the cooled air flow from one or more of compartments 102. In examples (e.g., when inlet 180 receives the cooled air flow from one or more of compartments 102), flow volume 186 may include a valve flow path 177 defined by valve 128.

Conduit 111 may be configured such that flow volume 186 extends through bulkhead 172. For example, in examples, conduit 111 is configured to pass through bulkhead 172. As an example, conduit 111 may be configured to extend through an access 188 (e.g., defined by bulkhead 172) to pass through bulkhead 172. Bulkhead 172 may be configured to maintain internal atmosphere EI greater than or equal to external atmosphere EO as conduit 111 passes through bulkhead 172.

In examples, conduit 111 includes a pressure seal 190 configured to assist in maintaining internal atmosphere EI greater than or equal to external atmosphere EO as conduit 111 passes through bulkhead 172. In some examples, pressure seal 190 is configured to engage bulkhead 172 and conduit 111 as conduit 111 passes through bulkhead 172. In examples, pressure seal 190 is configured to substantially surround (e.g., fully surround or nearly fully surround) an external perimeter defined by conduit 111 when pressure seal 178 engage bulkhead 172 and conduit 111. Pressure seal 190 may be configured to extend between conduit 111 and bulkhead 172 to, for example, substantially fill and/or block (e.g., fill or block to the extent permitted by manufacturing tolerances) any gaps and/or passages between internal atmosphere EI and external atmosphere EO which might otherwise be present in the absence of pressure seal 190. In examples, pressure seal 190 is positioned between and separates inlet portion 178 and outlet portion 182. Pressure seal 190 may be, for example, a fairlead, a stuffing tube, a packing, or some other type of pressure seal.

In some examples, assembly 109 is configured to establish a first orientation (e.g., a lowered configuration) relative to bulkhead 172 and/or boundary 174 and configured to establish a second orientation (e.g., a raised configuration) relative to bulkhead 172 and/or boundary 174. Assembly 109 may be configured to transition from the first orientation to the second orientation (e.g., during a takeoff of vehicle 101) and/or transition from the second orientation to the first orientation (e.g., during a landing of vehicle 101). In examples, assembly 109 is a landing gear assembly configured to move wheel 123 relative to bulkhead 172 and/or boundary 174 when assembly 109 transitions between the first orientation and the second orientation.

In examples, vehicle 101 is an aircraft and assembly 109 is a landing gear assembly including strut 112. In examples, strut 112 extends from fuselage 103 (e.g., a framework of fuselage 103). Strut 112 may be configured to move wheel 123 relative to bulkhead 172 and/or boundary 174 when assembly 109 transitions between the first orientation and the second orientation. For example, portions of strut 112 may be configured to move relative to bulkhead 172 and/or boundary 174 to cause wheel 123 to move relative to bulkhead 172 and/or boundary 174.

In examples, strut 112 and/or other portions of the landing gear assembly (e.g., wheel 123, assemblage 116, and/or a support structure 198 such as a bogie) are configured to extend from bay 113 in the first orientation (e.g., the lowered configuration). Strut 112 and/or the other portions of the landing gear assembly may be configured to substantially stow within bay 113 in the second configuration (e.g., the raised configuration). In examples, the landing gear assembly includes one or more links 194 including, for example, a sidestay link 196 configured to cause strut 112 to move wheel 123 relative to bulkhead 172 and/or boundary 174. Strut 112 may be configured to mechanically support at least one of assemblage 116 (e.g., an axle assembly) or support structure 198. In some examples, support structure 198 supports and/or defines assemblage 116.

Conduit 111 is configured to deliver the cooled air flow to interior volume 119 when assembly 109 is in the first orientation, when assembly 109 is in the second orientation, and/or when assembly 109 transitions between the first configuration and the second configuration. For example, conduit 111 may include flexible portion 136 configured to flex and/or bend when assembly 109 transitions between the first orientation relative and the second orientation. Hence, conduit 111 may be configured to provide cooling to interior volume 119 when a landing gear assembly is raised and positioned within bay 113, when the landing gear assembly is lowered and extending from bay 113, and/or when the landing gear assembly is transitioning between the raised configuration and the lowered configuration. In examples, outlet portion 182 includes flexible portion 136.

At least some portion of outlet portion 182 may be configured to move relative to bulkhead 172 and/or boundary 174 when strut 112 moves relative to bulkhead 172 and/or boundary 174. In examples, some portion of outlet portion 182 may be configured to be substantially stationary relative to strut 112 (e.g., as strut 112 moves relative to bulkhead 172 and/or boundary 174, outlet portion 182 moves with strut 112). In some examples, outlet portion 182 is configured to mechanically attach to assembly 109. For example, outlet portion 182 may be configured to mechanically attached to strut 112 using a fastener, such as a clip, a screw or bolt, and/or other type of fastener. In some examples, outlet portion 182 may be configured to mechanically attach to strut 112 using adhesives, engineering fits, fusion, friction, or welding or soldering. The mechanical attachment between outlet portion 182 and strut 112 may be substantially permanent, or, alternatively, may be configured to enable separation of outlet portion 182 and strut 112, such that outlet portion 182 and strut 112 remain substantially usable upon separation.

Valve 128 is configured to control a flow rate of the cooled air flow discharged into interior volume 119 from conduit 111. Valve 128 may be, for example, a globe valve, poppet valve, a needle valve, a gate valve, a spool valve, or some other mechanism or combination of mechanisms configured to control a flow rate through a valve body 202 of valve 128 and/or the flow path defined by conduit body 176. In examples, valve body 202 defines a valve inlet 204 and a valve outlet 206. Valve body 202 may be configured to define valve flow path 177 configured to allow a fluid (e.g., the cooled air flow) to flow from valve inlet 204 to valve outlet 206. In some examples, conduit 111 (e.g., inlet 180 or some other portion of conduit 111) is configured to mechanically engage valve outlet 206. In some examples, conduit 111 (e.g., inlet 180 or some other portion of conduit 111) is configured to directly or indirectly (e.g., via an intermediary conduit, a flange, a gasket, and/or another component) mechanically engage valve outlet 206.

In some examples, valve 128 is configured to translate a flow restricting element 208 relative to valve body 202 to control the flow rate of the cooled air flow. Flow restricting element 208 may be, for example, a disc, a globe, a poppet, a spool, or some other type of flow restricting element. Valve 128 may be configured to control a flow rate of the cooled air flow through valve flow path 177 to control the flow rate of the cooled air flow through the flow path defined by conduit body 176.

In examples, valve 128 is configured to control the flow rate of the cooled air flow (e.g., through valve flow path 177)

based on a position of flow restricting element 208 relative to valve body 202. For example, valve 128 may be configured to position flow restricting element 208 in a shut position to substantially cease the cooled air flow through valve body 202 (e.g., prevent all cooled air flow or nearly all air flow to the extent permitted by manufacturing tolerances) and, in examples, thereby cease the cooled air flow through conduit 111. Valve 128 is configured to position flow restricting element 208 in one or more open positions (e.g., one open position or multiple different open positions) to allow the cooled air flow through valve body 202 and, in examples, thereby allow cooled air flow through conduit 111. In examples in which valve 128 is configured to position flow restricting element 208 in multiple open positions, each open position can correspond to a different flow rate through valve 128. Valve 128 may control the flow rate of the cooled air flow using the shut position and the one or more open positions. In examples, valve 128 is configured to alter the flow rate of the cooled air flow through conduit 111 by altering a position of the flow restricting element 208 relative to valve body 202.

In examples, valve 128 includes an actuator 210 configured to cause flow restricting element 208 to translate relative to valve body 202. Actuator 210 may be any type of actuator sufficient to cause flow restricting element 208 to translate relative to valve body 202. Actuator 210 may be configured to position and/or alter a position of valve 128 based on a control signal received via communication link 132. In some examples, actuator 210 comprises a solenoid actuator configured to influence the position of valve 128 in response to a received electrical or electronic communication (e.g., received via communication link 132) In some examples, actuator 210 may be configured to position and/or alter a position of valve 128 based on a supply of a control fluid. For example, valve 128 may be a hydraulically or pneumatically operated valve. Valve 128 may include control circuitry configured to control components of valve 128 in response to a received control signal. The control circuitry may be some portion of control circuitry 130 or may be separate from control circuitry 130. In examples, valve 128 is configured to provide communications to control circuitry 130 and/or other devices in data communication with control circuitry 130.

FIG. 4 illustrates an example assembly 109 including strut 112, support structure 198, and assemblage 116. Assemblage 116 may include an axle 131. Assembly 109 defines interior volume 119. In examples, assemblage 116 (e.g., axle 131) defines interior volume 119. In examples, another portion of assembly 109, such as strut 112 and/or support structure 198, defines interior volume 119. In some examples, a longitudinal axis L defined by assemblage 116 extends through at least some portion of interior volume 119. Strut 112, support structure 198, assemblage 116, a wheel rim 220, a tire 222, portions of a brake assembly 228, and an end cap 250 are illustrated as cross-sections with a cutting plane taken parallel to longitudinal axis L.

FIG. 4 depicts assembly 109 with strut 112 mechanically engaged with and supporting support structure 198, and support structure 198 mechanically engaged with and supporting assemblage 116 and/or axle 131. However, this is not required in all examples. In some examples, strut 112 may be mechanically engaged with and supporting assemblage 116 and/or axle 131 (e.g., in some examples, assembly 109 may not include support structure 198). In other examples, assembly 109 may support assemblage 116 and/or axle 131 in other manners.

In examples, axle 131 defines interior volume 119. For example, axle 131 may be a substantially hollow axle (e.g., part of axle 131 may be hollow). Axle 131 includes a body ("axle body 214") defining an exterior surface 216 ("axle exterior surface 216") and an interior surface 218 ("axle interior surface 218") opposite axle exterior surface 216. Axle interior surface 218 may define at least some portion of a boundary defining interior volume 119. In examples, vehicle 101 (e.g., assembly 109) includes one or more components such as component 212 positioned within interior volume 119. Component 212 may be, for example, a speed sensor configured to determine a rotational speed of wheel 123, one or more cables (e.g., power cables), and/or other components.

Assemblage 116 (e.g., axle 131 and/or axle exterior surface 216) may be configured to support wheel 123. In examples, wheel 123 includes a wheel rim 220 supporting a tire 222. Wheel rim 220 and/or tire 222 may be configured to rotate about longitudinal axis L when assemblage 116 supports wheel 123. In examples, tire 222 substantially surrounds wheel rim 220, such that wheel rim 220 is between tire 222 and assemblage 116 (e.g., axle 131 and/or axle exterior surface 216). In examples, assemblage 116 supports wheel 123 using one or more bearings such as bearing 224 and bearing 226. Bearings 224, 226 may be configured to allow a rotation of wheel 123 (e.g., wheel rim 220, tire 222) relative to assemblage 116 (e.g., axle 131). At least some portions of assemblage 116 (e.g., axle 131) may be configured to be substantially stationary relative to strut 112 and/or support structure 198 when wheel 123 rotates relative to assemblage 116.

Assemblage 116 (e.g., an axle assembly) may support a brake assembly 228 configured to limit and/or decelerate the rotation of wheel 123 about assemblage 116 (e.g., about axle 131). Brake assembly 228 may include a torque tube 229 supported by and/or configured to remain substantially stationary with assemblage 116 (e.g., axle 131). In examples, brake assembly includes a disc stack 230 configured to limit the rotation and/or decelerate of wheel 123. In examples, torque tube 229 supports disc stack 230.

Disc stack 230 may include one or more rotor discs such as rotor disc 232 configured to rotate substantially synchronously with wheel 123. Rotor disc 232 may be mechanically coupled to wheel rim 220 (e.g., via a rotor drive key 234), such that limiting and/or decelerating a rotation of rotor disc 232 about assemblage 116 limits and/or decelerates a rotation of wheel 123 about assemblage 116. Disc stack 230 may include one or more stator discs such as stator disc 236 configured to remain substantially stationary with at least some portion of assemblage 116 (e.g., axle 131). In examples, stator disc 236 is mechanically coupled to assemblage 116 and/or torque tube 229 (e.g., via a spline 238), such that stator disc 236 remains substantially stationary relative to one or more portions of assemblage 116 and/or torque tube 229.

Brake assembly 228 may be configured to cause frictional engagement between rotor disc 232 and stator disc 236 to limit the rotation and/or decelerate of wheel 123. The frictional engagement may reduce and/or limit the rotation of rotor disc 232 about assemblage 116, such that rotor disc 232 (e.g., via rotor drive key 234) limits the rotation of and/or decelerates wheel 123. In examples, brake assembly 228 is configured to compress disc stack 230 (e.g., along an axis substantially parallel to longitudinal axis L) to cause the frictional engagement. In examples, brake assembly includes an actuator 240 configured to compress disc stack 230. Actuator 240 may be configured to compress disc stack 230 in response to a control signal originating at, for example, flight deck 108 (FIG. 1).

The frictional engagement of rotor disc 232 and stator disc 236 may generate heat. Assemblage 116 and/or other components of vehicle 101 and/or assembly 109 may act to transfer the heat from brake assembly 228 and into interior volume 119. This transfer of heat may tend to increase a temperature of interior volume 119, and/or a temperature of component 212. System 100 (e.g., conduit 111) is configured to provide the cooled air flow to interior volume 119 to, for example, limit and/or mitigate the temperature increase of interior volume 119 and/or the component 212. For example, system 100 may be configured to provide the cooled air flow (e.g., flow F9) to interior volume 119 during and/or following a braking operation by brake assembly 228. In examples, flow F9 is at least a portion of flow F8 (FIGS. 1-3).

Conduit 111 may be configured to provide the cooled air flow to interior volume 119 using outlet portion 182 (e.g., outlet 184). In examples, outlet portion 182 is configured to discharge the cooled air flow into a volume 242 defined by assembly 109 and fluidically coupled to interior volume 119. Volume 242 may be defined by any portion of assembly 109, including strut 112, support structure 198, and/or assemblage 116. Outlet portion 182 may be configured to mechanically couple to assembly 109 to cause outlet 184 to discharge the cooled air flow into volume 242. In examples, outlet 184 is configured to extend into and/or through an access 244 of assembly 109. Access 244 may be configured to provide access from external environment EO surrounding assembly 109 to volume 242 and/or interior volume 119. For example, access 244 may be configured to provide access to volume 242 and/or interior volume 119 for one or more cables (e.g., control and/or power cables, such as a cable 246 and/or a cable 248) extending within volume 242 and/or interior volume 119. In some examples, access 244 is an existing access configured to provide and/or providing access to the one or more cable. Conduit 111 may be configured to allow for installation using access 244, such that system 100 may be retrofit onto vehicle 101.

System 100 is configured to flow the cooled air flow (e.g., discharge flow F9) through interior volume 119 to provide cooling to component 212. In some examples, system 100 is configured to flow the cooled air flow through interior volume 119 substantially in an outboard direction D1 defined by assembly 109. In addition or instead of the outboard direction D1, in some examples, system 100 is configured to flow the cooled air flow through interior volume 119 substantially in an inboard direction D2 defined by assembly 109 and opposite outboard direction D1. In examples, outboard direction D1 extends in a direction from strut 112 toward wheel 123 and inboard direction D2 extends in a direction from wheel 123 toward strut 112.

In examples, system 100 is configured to exhaust the cooled air flow (e.g., flow F9) to external atmosphere EO. For example, system 100 may be configured to exhaust the cooled air flow to external atmosphere EO subsequent to flowing the cooled air flow through interior volume 119. In examples, system 100 is configured to discharge the cooled air flow through an end cap 250 attached to assemblage 116. In the example shown in FIG. 4, end cap 250 is positioned between interior volume 119 and external atmosphere EO. In some examples, end cap 250 is mechanically attached to a distal end 252 of assemblage 116 ("assemblage distal end 252"). End cap 250 is configured to provide access to interior volume 119 and/or volume 242 from external environment EO surrounding assembly 109. For example, end cap 250 may be configured to provide access to interior volume 119 and/or volume 242 for maintenance personnel positioned within external environment EO (e.g., personnel displaced in outboard direction D1 from wheel 123).

End cap 250 may be configured to mechanically attach to assemblage 116 in any suitable manner. For example, end cap 250 may be configured to mechanically attach to assemblage 116 using a fastener, such as a clip, a screw or bolt, and/or other type of fastener. In some examples, end cap 250 is configured to mechanically attach to assemblage 116 using adhesives, engineering fits, fusion, friction, or welding or soldering. The mechanical attachment between end cap 250 and assemblage 116 may be substantially permanent, or, alternatively, may be configured to enable separation of end cap 250 and assemblage 116, such that outlet portion 182 and strut 112 remain substantially usable upon separation.

In examples, end cap 250 defines an inner surface 254 ("cap inner surface 254") and an outer surface 256 ("cap outer surface 256") substantially opposite inner cap surface 254. Cap inner surface 256 (e.g., with axle interior surface 218) may define at least a portion of the boundary defining interior volume 119. In some examples, end cap 250 is configured such that cap inner surface 254 faces in a direction toward interior volume 119 (e.g., inboard direction D2) and cap outer surface 256 faces in a direction away from interior volume 119 (e.g., outboard direction D1) when end cap 250 is mechanically attached to assemblage 116 (e.g., assemblage distal end 252).

End cap 250 may include one or more outlets such as outlet 258 configured to fluidically couple interior volume 119 and external environment EO. System 100 may be configured to exhaust the cooled air flow from interior volume 119 to external environment EO using outlet 258. In examples, outlet 258 defines a channel extending through end cap 250. The channel may extend from a first end which opens to cap inner surface 254 to a second end which opens to cap outer surface 256.

In some examples, system 100 includes a sensor 260 configured to sense a temperature indicative of a temperature within interior volume 119. Sensor 260 may be positioned to sense the indicative temperature at any location. For example, in some examples, sensor 260 may be positioned within interior volume 119. In some examples, sensor 260 may be configured to sense a temperature of a component or system in thermal communication with interior volume 119. For example, sensor 260 may be positioned in a component of or volume defined by brake assembly 228, a component of or volume defined by assembly 109, a component of or volume defined by wheel 123, or another component or volume in thermal communication with interior volume 119. Sensor 260 may be configured to communicate a signal indicative of the temperature to control circuitry 130 (e.g., using a communication link 262). In some examples, control circuitry 130 is configured to control and/or adjust a position of valve 128 (to control a flow of cooled air into interior volume 119) based on the signal communicated by sensor 260.

In some examples, assembly 109 supports a second wheel 264 (FIG. 3). Second wheel 264 may include a second tire 266 and/or a second wheel rim 268 supporting second wheel 264. Assembly 109 may include a second assemblage supporting second wheel 264 and/or a second brake assembly configured to limit and/or reduce a rotation of second wheel 264 relative to the second assemblage. The second assemblage and/or second brake assembly may be configured relative to second wheel 264 in substantially the same manner as assemblage 116 and/or brake assembly 228 are configured relative to wheel 123. In examples, system 100

(e.g., conduit 111) is configured to discharge the cooled air flow into volume 242 (FIG. 4) to cause the cooled air to flow in a direction towards wheel 123 and flow in a direction toward second wheel 264. For example, system 100 may be configured to discharge the cooled air flow to cause a first portion (e.g., flow F9) to flow in a first direction (e.g., outboard direction D1) toward wheel 123 and cause a second portion (e.g., flow F10) to flow in a second direction (e.g., substantially opposite the first direction) toward second wheel 264.

Control circuitry 130 may include fixed function circuitry and/or programmable operating circuitry. In examples, control circuitry 130 includes circuitry configured to perform one or more functions of operating circuitry, such as sensing circuitry, processing circuitry, switching circuitry, communication circuitry, and/or other circuitries. Control circuitry 130, as well as other processors, operating circuitry, controllers, control circuitry, processing circuitry, and the like, described herein, may include any combination of integrated circuitry, discrete logic circuitry, analog circuitry, such as one or more microprocessors, digital signal processors (DSPs), application specific integrated circuits (ASICs), or field-programmable gate arrays (FPGAs). In some examples, control circuitry 130 includes multiple components, such as any combination of one or more microprocessors, one or more DSPs, one or more ASICs, or one or more FPGAs, as well as other discrete or integrated logic circuitry, and/or analog circuitry.

Functions attributed to control circuitry 130 may be embodied as software, firmware, hardware or any combination thereof. Control circuitry 130 may include, for instance, a variety of capacitors, transformers, switches, and the like configured to perform the functions of control circuitry 130. In examples, control circuitry 130 may be configured to communicate with another device, such as ECS 114, a cabin pressure control system of vehicle 101, user input device 134, sensor 260, and/or other system and/or components of vehicle 101. Control circuitry 130 may include any suitable hardware, firmware, software or any combination thereof for communicating with another device. In addition, control circuitry 130 may communicate with a networked computing device and a computer network.

System 100 (e.g., control circuitry 130) can also include memory configured to store program instructions, such as software, which may include one or more program modules, which are executable by control circuitry 130. The program instructions may be embodied in software and/or firmware. The memory can include any volatile, non-volatile, magnetic, optical, or electrical media, such as a random access memory (RAM), read-only memory (ROM), non-volatile RAM (NVRAM), electrically-erasable programmable ROM (EEPROM), ferroelectric RAM (FRAM), flash memory, or any other digital media. In some examples, the memory includes computer-readable instructions that, when executed by control circuitry 130 cause control circuitry 130 to perform various functions described herein and/or other functions of control circuitry 130.

User input device 134 may have any suitable configuration. For example, user input device 134 can include a switch (e.g., a mechanical switch), a button or keypad, a speaker configured to receive voice commands from a user, a display, such as a liquid crystal (LCD), light-emitting diode (LED), or organic light-emitting diode (OLED). In some examples, user input device 134 may include a touch screen. User input device 134 may be configured to receive a user input. The user input may cause control circuitry 130 to cause valve 128 to establish and/or maintain one or more positions, such as a shut position or one of one or more open positions. The user input may cause control circuitry 130 to cause valve 128 to alter its position from a first position to a second position. In some examples, user input device 134 is also configured to display information, such as one or more indications providing information on the actuation of system 100. User input 134 may be configured to receive inputs indicative of a position of valve 128, a desired activation of the cooling (e.g., delivered via conduit 111), a desired cooling rate, or any other suitable input that corresponds to a cooling rate and/or the cooling provided by system 100 (e.g., via conduit 111).

Communication links 132, 135, 262 may be hard-line and/or wireless communications links. In some examples, communication links 132, 135, 262 may comprise some portion of control circuitry 60. In some examples, communication links 132, 135, 262 comprise a wired connection, a wireless Internet connection, a direct wireless connection such as wireless LAN, Bluetooth™, Wi-Fi™, and/or an infrared connection. Communication links 132, 135, 262 may utilize any wireless or remote communication protocol.

As used here, when a first portion of a system (e.g., system 100) is substantially parallel to a second portion of or an axis defined by the system, this may mean the first portion is parallel or nearly parallel to the second portion or the axis to the extent permitted by manufacturing tolerances. In some examples, when the first portion is substantially parallel to the second portion or the axis, this may mean a first vector defined by the first component of the system defines an angle of less than 10 degrees, in some examples less than 5 degrees, and in some examples less than 1 degree, with a second vector defined by the second component or the axis.

As used here, when a first portion of a system (e.g., system 100) supports a second portion of the system, this means that when the second portion causes a first force to be exerted on the first portion, the first portion causes a second force to be exerted on the second portion in response to the first force. The first force and/or second force may be a contact force and/or an action-at-a-distance force. For example, first force and/or second force may be mechanical force, a magnetic force, a gravitational force, or some other type of force. The first portion of the system may be a portion of the system or a portion of a component of the system. The second portion of the system may be another portion of the system or another portion of the same component or a different component. In some examples, when the first portion of the system supports the second portion of the system, this may mean the second portion is mechanically supported by and/or mechanically connected to the first portion.

Figure 5:
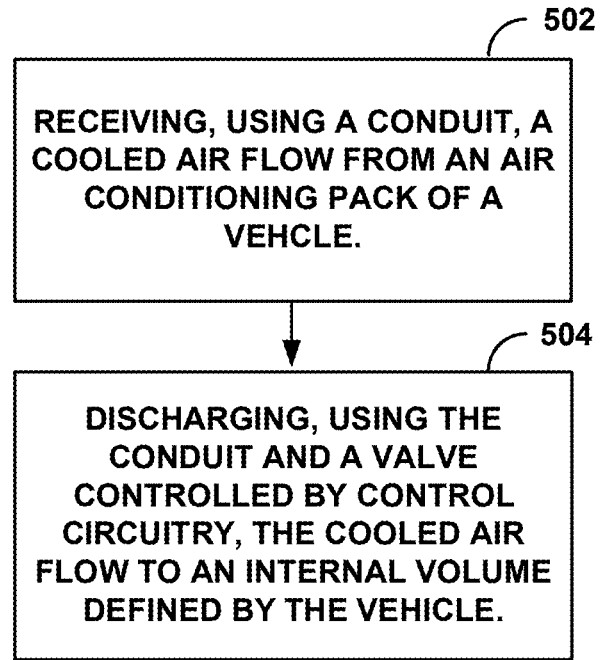
FIG. 5 is a flow diagram illustrating an example method of providing a cooled air flow to one or more components of a vehicle.

FIG. 5 is a flow diagram illustrating an example technique for cooling an interior volume 119 defined by a vehicle 101. While the technique is described with reference to system 100 described herein, the technique may be used with other components and/or systems in other examples.

The technique includes receiving, using a conduit 111 mechanically connected to an assembly 109 of vehicle 101, a cooled air flow. In examples, vehicle 101 is an aircraft. Assembly 109 may be a landing gear assembly supported a wheel 123. In some examples, conduit 111 is mechanically connected to a strut 112 of the landing gear assembly.

Conduit 111 may receive the cooled air flow from a pack 104 of vehicle 101 (e.g., either directly or indirectly) (502). For example, conduit 111 may receive the cooled air flow from an air cycle machine 154 of pack 104. As another example, conduit 111 may receive the cooled air flow from a portion of vehicle 101 which receives the cooled air flow from pack 104. For example, conduit 111 may receive the cooled air flow from one or more portions of an ECS 114, such as an air distribution system 120, an air return system 122, a mixing manifold 118, a pack discharge 129, and/or another portion of ECS 114. In some examples, conduit 111 receives the cooled air flow from one of more of compartments 102 (e.g., one or more of a cabin 106, a flight deck 108, a cargo hold 110, and/or other compartments of vehicle 101). In examples, conduit 111 receives the cooled air flow from any portion of vehicle 101 configured to fluidically couple to pack discharge 129.

A valve 128 may control a flow rate of the cooled air flow. In examples, control circuitry 130 controls and/or adjusts a position of valve 128 (e.g., via a communication link 132) to, for example, cause valve 128 to control the flow rate. In examples, a user input device 134 (e.g., a switch) operable by, for example, a flight crew member or maintenance member, causes control circuitry 130 to control and/or adjust the position of valve 128 (e.g., by directly specifying a valve position, a desired activation of the cooling, a desired cooling rate, or any other suitable input that corresponds to a cooling rate). User input device 134 (e.g., located in flight deck 108) may transmit a signal indicative of an input provided by a user to control circuitry 130 (e.g., via communication link 135). Control circuitry 130, in response to receiving the user input, may control and/or adjust the position of valve 128 In some examples, control circuitry 130 controls and/or adjusts the position of valve 128 based on a signal from a sensor 260. The signal may be indicative of a temperature within interior volume 119.

In examples, conduit 111 passes through a bulkhead 172 of vehicle 101 to deliver the cooled air flow to interior volume 119. Bulkhead 172 may substantially separate a pressurized space of vehicle 101 from an unpressurized space of vehicle 101 and/or an external environment EO. In examples, an inlet portion 178 of conduit 111 is positioned within the pressurized space and an outlet portion 182 is positioned in the unpressurized space and/or external environment EO. In examples, inlet portion 178 receives the cooled air flow (e.g., using an inlet 180) from valve 128 and/or compartments 102. Outlet portion 182 may deliver (e.g., using an outlet 184) the cooled air flow to interior volume 119. In examples, conduit 111 delivers the cooled air flow using a flow volume 186 defined by a conduit body 176. Flow volume 186 and/or conduit body 176 may pass through bulkhead 172.

In examples, conduit 111 delivers the cooled air flow to interior volume 119 when assembly 109 (e.g., a landing gear assembly) is in a first orientation (e.g., a raised configuration) relative to a portion of vehicle 101 (e.g., bay 113). Conduit 111 may deliver the cooled air flow to interior volume 119 when assembly 109 is in a second orientation (e.g., a raised configuration) relative to the portion of vehicle 101. In some examples, conduit 111 delivers the cooled air flow to interior volume 119 when assembly 109 transitions between the first configuration and the second configuration. In examples, a flexible portion 136 of conduit 111 moves relative to the portion of vehicle 101 when assembly 109 transitions between the first orientation relative and the second orientation. In examples, flow volume 186 extends through flexible portion 136.

The technique includes discharging, from conduit 111, the cooled air flow into an interior volume 119 defined by assembly 109 (504). In examples, a valve 128 controls a flow rate of the cooled air flow provided by conduit 111. In some examples, conduit 111 discharges the cooled air flow to interior volume 119 of the landing gear assembly. In some examples, conduit 111 discharges the cooled air flow to interior volume 119 defined by an assemblage of the landing gear assembly. The technique may include cooling, using the cooled air flow discharged from conduit 111, one or more components 212 within interior volume 119.

Conduit 111 may discharge the cooled air flow into interior volume 119 of assemblage 116. In examples, assemblage 116 includes axle 131 supporting wheel 123. Assemblage 116 may support a brake assembly 228 configured to limit and/or decelerate the rotation of wheel 123 about assemblage 116 (e.g., about axle 131). In examples, conduit 111 discharges the cooled air flow to remove heat generated by brake assembly 228 (e.g., heat resulting from a braking operation). Conduit 111 may discharge the cooled air flow to interior volume 119 to limit and/or mitigate a temperature increase of interior volume 119 and/or the component 212. In examples, conduit 111 discharges the cooled air flow into a volume 242 defined by assembly 109 and fluidically coupled to interior volume 119. In examples, conduit 111 delivers the cooled air flow to interior volume 119 using an access 244 configured to provide access from external environment EO to volume 242 and/or interior volume 119.

System 100 may flow the cooled air flow through interior volume 119 (e.g., substantially in an outboard direction D1) to provide cooling to component 212. In some examples, system 100 is configured to flow the cooled air flow through interior volume 119 substantially in an outboard direction D1 defined by assembly 109. In examples, system 100 exhausts the cooled air flow from interior volume 119 of another portion of assembly 109 to external atmosphere EO. In examples, system 100 exhausts the cooled air flow through an end cap 250 attached to assemblage 116. In examples, system 100 exhausts the cooled air flow through an outlet 258 extending between a cap inner surface 254 and a cap outer surface 256.

The disclosure includes the following examples.

Example 1: An assembly comprising: a conduit configured to provide cooling to one or more components within an interior volume defined by a hollow axle of an aircraft, wherein the conduit is configured to receive a cooled air flow produced by an air conditioning pack of the aircraft, wherein the conduit is configured to mechanically connect to a strut of a landing gear of the aircraft, and wherein the conduit is configured to discharge the cooled air flow to a volume defined by the landing gear, wherein the volume is in fluidic communication with the interior volume defined by the hollow axle; a valve configured to control a flow rate of the cooled air flow provided by the conduit; and control circuitry configured to control the valve.

Example 2: The assembly of example 1, wherein the conduit is fluidically coupled with at least one of a compartment of the aircraft, a mixing manifold of the aircraft, an air distribution system of the aircraft, an air return system of the aircraft, or a pack discharge of the air conditioning pack when the conduit is mechanically connected to the strut.

Example 3: The assembly of example 1 or example 2, further comprising a user input device configured to receive an input from a user, wherein the user input device is configured to provide the input to the control circuitry, and wherein the control circuitry is configured to provide a signal to the valve based on the input.

Example 4: The assembly of any of examples 1-3, wherein the conduit is configured to receive the cooled air flow from the valve using an inlet defined by an inlet portion and discharge the cooled air flow to the volume using an outlet defined by an outlet portion opposite the inlet portion, and wherein a body of the conduit defines a flow volume which extends continuously from the inlet to the outlet.

Example 5: The assembly of any of examples 1-4, wherein the conduit is configured to establish a first configuration when the landing gear is in a lowered configuration and establish a second configuration when the landing gear is in a raised configuration, and wherein the wherein the conduit is configured to receive the cooled air flow and discharge the cooled air flow to the volume in the first configuration and in the second configuration.

Example 6: The assembly of example 5, wherein the conduit is configured to at least one of flex or bend when the conduit transitions between the first configuration and in the second configuration.

Example 7: The assembly of any of examples 1-6, wherein the conduit is configured to receive the cooled air flow from the valve using an inlet portion and discharge the cooled air flow to the volume using an outlet portion opposite the inlet portion, and wherein the outlet portion is configured to mechanically connect to at least one of a body of a support structure of the landing gear or a body of the hollow axle.

Example 8: The assembly of any of examples 1-7, further comprising a pressure seal separating an inner section of the conduit and an outer section of the conduit, wherein the inner section is configured to position within a pressurized space of the aircraft and the outer section is configured to position within an unpressurized space, wherein the unpressurized space is at least one of a space defined by the aircraft or a space surrounding the aircraft, and wherein the pressure seal is configured to configured to limit a flow of fluid from the pressurized space to the unpressurized space.

Example 9: The assembly of any of examples 1-8, further comprising the hollow axle, wherein the hollow axle is configured to support a wheel of the landing gear.

Example 10: The assembly of example 9, further comprising a sensor positioned within the interior volume, wherein the sensor is configured to sense a rotation speed of the wheel, and wherein the conduit is configured to provide cooling to the sensor.

Example 11: The assembly of example 9 or example 10, wherein the hollow axle includes an end cap, wherein the hollow axle is configured to support the wheel between the strut and the end cap, and wherein the conduit is configured to cause the cooled air flow to flow through the interior volume and discharge through one or more outlets defined by the end cap.

Example 12: The assembly of any of examples 9-11, wherein the wheel is a first wheel, and wherein the hollow axle is configured to support a second wheel of the landing gear separated from the first wheel by the strut, and wherein the conduit is configured to discharge the cooled air flow to the volume to cause the cooled air flow to flow in a direction towards the first wheel and in a direction toward the second wheel.

Example 13: The assembly of examples 9-12, further comprising a brake assembly configured to reduce a rotation of the wheel about the hollow axle, wherein the brake assembly is configured to be supported by the hollow axle, and wherein the hollow axle is configured to receive heat from the brake assembly when the brake system reduces the rotation of the wheel and the hollow axle supports the braking system.

Example 14: The assembly of any of examples 1-13, further comprising the air conditioning pack, wherein the air conditioning pack is configured to cool an air flow to produce the cooled air flow, wherein the air conditioning pack is configured to cool the air flow using a compressor to compress the air flow and a turbine to expand the air flow.

Example 15: The assembly of example 14, further comprising at least one of a turbine engine configured to provide air to a bleed system of the aircraft or an auxiliary power unit configured to provide air to the bleed system, wherein the air conditioning pack is configured to receive the air flow from the at least one of the turbine engine or the auxiliary power unit.

Example 16: An assembly comprising: a conduit configured to provide a cooled air flow to one or more components within an interior volume defined by a hollow axle of an aircraft; an air conditioning pack configured to cool an air flow to produce the cooled air flow, wherein the conduit is configured to mechanically connect to a strut of a landing gear of the aircraft, the conduit configured to fluidically couple with at least one of a compartment of the aircraft, a mixing manifold of the aircraft, an air distribution system of the aircraft, an air return system of the aircraft, or a pack discharge of the air conditioning pack, and wherein the conduit is configured to discharge the cooled air flow to a volume defined by the landing gear of the aircraft, wherein the volume is in fluidic communication with the interior volume defined by the hollow axle; a valve configured to control a flow rate of the cooled air flow provided by the conduit; control circuitry configured to control the valve; and at least one of: a turbine engine of the aircraft, or a power unit of the aircraft, wherein the turbine engine or the power unit is configured to provide an air flow to the air conditioning pack, and wherein the cooled air flow comprises the air flow.

Example 17: The assembly of example 16, wherein the conduit is configured to establish a first configuration when the landing gear is in a lowered configuration and establish a second configuration when the landing gear is in a raised configuration, and wherein the wherein the conduit is configured to receive the cooled air flow and discharge the cooled air flow to the volume in the first configuration and in the second configuration.

Example 18: The assembly of example 17, wherein the conduit is configured to receive the cooled air flow from the valve using an inlet portion and discharge the cooled air flow to the volume using an outlet portion opposite the inlet portion, and wherein the outlet portion is configured to mechanically connect to at least one of a body of a support structure of the landing gear or a body of the hollow axle.

Example 19: A method, comprising: receiving, using a conduit mechanically connected to a strut of a landing gear of an aircraft, a cooled air flow provided by an air conditioning pack of the aircraft; and discharging, from the conduit and using a valve configured to control a flow rate of the cooled air flow provided by the conduit, the cooled air flow to a volume defined by the landing gear of the aircraft to provide cooling to one or more components within an interior volume defined by a hollow axle of the aircraft, wherein the volume is in fluidic communication with the interior volume.

Example 20: The method of example 19, wherein receiving the cooled air flow comprises receiving, using the conduit, the cooled air flow from at least one of a compartment of the aircraft, a mixing manifold of the aircraft, an air distribution system of the aircraft, an air return system of the aircraft, or a pack discharge of the air conditioning pack.

Various examples have been described. These and other examples are within the scope of the following claims.

What is claimed is:

1. An assembly comprising:

a conduit configured to provide cooling to one or more components within an interior volume defined by a hollow axle of an aircraft, wherein the conduit is configured to receive a cooled air flow produced by an air conditioning pack of the aircraft, wherein the conduit is configured to mechanically connect to a strut of a landing gear of the aircraft, and wherein the conduit is configured to discharge the cooled air flow to a volume defined by the landing gear, wherein the volume is in fluidic communication with the interior volume defined by the hollow axle;

a valve configured to control a flow rate of the cooled air flow provided by the conduit; and control circuitry configured to control the valve.

2. The assembly of claim 1, wherein the conduit is fluidically coupled with at least one of a compartment of the aircraft, a mixing manifold of the aircraft, an air distribution system of the aircraft, an air return system of the aircraft, or a pack discharge of the air conditioning pack when the conduit is mechanically connected to the strut.

3. The assembly of claim 1, further comprising a user input device configured to receive an input from a user, wherein the user input device is configured to provide the input to the control circuitry, and wherein the control circuitry is configured to provide a signal to the valve based on the input.

4. The assembly of claim 1, wherein the conduit is configured to receive the cooled air flow from the valve using an inlet defined by an inlet portion and discharge the cooled air flow to the volume using an outlet defined by an outlet portion opposite the inlet portion, and wherein a body of the conduit defines a flow volume which extends continuously from the inlet to the outlet.

5. The assembly of claim 1, wherein the conduit is configured to establish a first configuration when the landing gear is in a lowered configuration and establish a second configuration when the landing gear is in a raised configuration, and wherein the wherein the conduit is configured to receive the cooled air flow and discharge the cooled air flow to the volume in the first configuration and in the second configuration.

6. The assembly of claim 5, wherein the conduit is configured to at least one of flex or bend when the conduit transitions between the first configuration and in the second configuration.

7. The assembly of claim 1, wherein the conduit is configured to receive the cooled air flow from the valve using an inlet portion and discharge the cooled air flow to the volume using an outlet portion opposite the inlet portion, and wherein the outlet portion is configured to mechanically connect to at least one of a body of a support structure of the landing gear or a body of the hollow axle.

8. The assembly of claim 1, further comprising a pressure seal separating an inner section of the conduit and an outer section of the conduit, wherein the inner section is configured to position within a pressurized space of the aircraft and the outer section is configured to position within an unpressurized space, wherein the unpressurized space is at least one of a space defined by the aircraft or a space surrounding the aircraft, and wherein the pressure seal is configured to configured to limit a flow of fluid from the pressurized space to the unpressurized space.

9. The assembly of claim 1, further comprising the hollow axle, wherein the hollow axle is configured to support a wheel of the landing gear.

10. The assembly of claim 9, further comprising a sensor positioned within the interior volume, wherein the sensor is configured to sense a rotation speed of the wheel, and wherein the conduit is configured to provide cooling to the sensor.

11. The assembly of claim 9, wherein the hollow axle includes an end cap, wherein the hollow axle is configured to support the wheel between the strut and the end cap, and wherein the conduit is configured to cause the cooled air flow to flow through the interior volume and discharge through one or more outlets defined by the end cap.

12. The assembly of claim 9, wherein the wheel is a first wheel, and wherein the hollow axle is configured to support a second wheel of the landing gear separated from the first wheel by the strut, and wherein the conduit is configured to discharge the cooled air flow to the volume to cause the cooled air flow to flow in a direction towards the first wheel and in a direction toward the second wheel.

13. The assembly of claim 9, further comprising a brake assembly configured to reduce a rotation of the wheel about the hollow axle, wherein the brake assembly is configured to be supported by the hollow axle, and wherein the hollow axle is configured to receive heat from the brake assembly when the brake system reduces the rotation of the wheel and the hollow axle supports the braking system.

14. The assembly of claim 1, further comprising the air conditioning pack, wherein the air conditioning pack is configured to cool an air flow to produce the cooled air flow, wherein the air conditioning pack is configured to cool the air flow using a compressor to compress the air flow and a turbine to expand the air flow.

15. The assembly of claim 14, further comprising at least one of a turbine engine configured to provide air to a bleed system of the aircraft or an auxiliary power unit configured to provide air to the bleed system, wherein the air conditioning pack is configured to receive the air flow from the at least one of the turbine engine or the auxiliary power unit.

16. An assembly comprising:

a conduit configured to provide a cooled air flow to one or more components within an interior volume defined by a hollow axle of an aircraft;

an air conditioning pack configured to cool an air flow to produce the cooled air flow, wherein the conduit is configured to mechanically connect to a strut of a landing gear of the aircraft, the conduit configured to fluidically couple with at least one of a compartment of the aircraft, a mixing manifold of the aircraft, an air distribution system of the aircraft, an air return system of the aircraft, or a pack discharge of the air conditioning pack, and wherein the conduit is configured to discharge the cooled air flow to a volume defined by the landing gear of the aircraft, wherein the volume is in fluidic communication with the interior volume defined by the hollow axle;

a valve configured to control a flow rate of the cooled air flow provided by the conduit;

control circuitry configured to control the valve; and at least one of:

a turbine engine of the aircraft, or a power unit of the aircraft, wherein the turbine engine or the power unit is configured to provide an air flow to the air conditioning pack, and wherein the cooled air flow comprises the air flow.

17. The assembly of claim 16, wherein the conduit is configured to establish a first configuration when the landing gear is in a lowered configuration and establish a second configuration when the landing gear is in a raised configuration, and wherein the wherein the conduit is configured to receive the cooled air flow and discharge the cooled air flow to the volume in the first configuration and in the second configuration.

18. The assembly of claim 17, wherein the conduit is configured to receive the cooled air flow from the valve using an inlet portion and discharge the cooled air flow to the volume using an outlet portion opposite the inlet portion, and wherein the outlet portion is configured to mechanically connect to at least one of a body of a support structure of the landing gear or a body of the hollow axle.

19. A method, comprising:

receiving, using a conduit mechanically connected to a strut of a landing gear of an aircraft, a cooled air flow provided by an air conditioning pack of the aircraft; and discharging, from the conduit and using a valve configured to control a flow rate of the cooled air flow provided by the conduit, the cooled air flow to a volume defined by the landing gear of the aircraft to provide cooling to one or more components within an interior volume defined by a hollow axle of the aircraft, wherein the volume is in fluidic communication with the interior volume.

20. The method of claim 19, wherein receiving the cooled air flow comprises receiving, using the conduit, the cooled air flow from at least one of a compartment of the aircraft, a mixing manifold of the aircraft, an air distribution system of the aircraft, an air return system of the aircraft, or a pack discharge of the air conditioning pack.

\* \* \* \* \*